Dec. 19, 1922.

P. H. KUHN.
PISTON.
FILED MAY 9, 1921.

1,439,109.

INVENTOR
Preston H. Kuhn
BY
Fred C. Matheny
ATTORNEY

Patented Dec. 19, 1922.

1,439,109

UNITED STATES PATENT OFFICE.

PRESTON H. KUHN, OF SEATTLE, WASHINGTON.

PISTON.

Application filed May 9, 1921. Serial No. 467,963.

*To all whom it may concern:*

Be it known that I, PRESTON H. KUHN, a citizen of the United States, residing at Seattle, in the county of King and State of Washington, have invented a certain new and useful Improvement in Pistons, of which the following is a specification.

This invention relates to improvements in pistons for internal combustion engines and the object of this improvement is to provide a piston having resilient cushion means interposed between the head or thrust receiving end of the piston and the point of connection of the piston with the connecting rod so that the connecting rod and crank shaft and the bearings for the same will be relieved of the sudden shock and strain that ordinarily occurs when a fuel charge is exploded within an engine cylinder.

Another object is to provide a piston having cushion means as above described for absorbing the shock of the explosions thereby permitting the fuel charge to be more highly compressed, and, by reason of such greater compression to develop more power.

A further object is to provide a piston having the portion that is above the transverse connecting rod pin made in two parts that are yieldingly supported in spaced apart relation in such a manner as to form an air cushion therebetween.

A still further object is to provide means for admitting air into the space between the two parts of the piston when the piston is at the lowermost limit of its stroke thus insuring that there will always be an air cushion to absorb the shock when an explosion occurs.

With the above and other objects in view as will be apparent from the following description the invention consists in the novel construction, adaptation and combination of parts of a piston for an internal combustion engine as will be more clearly hereinafter described and claimed.

Figure 1:
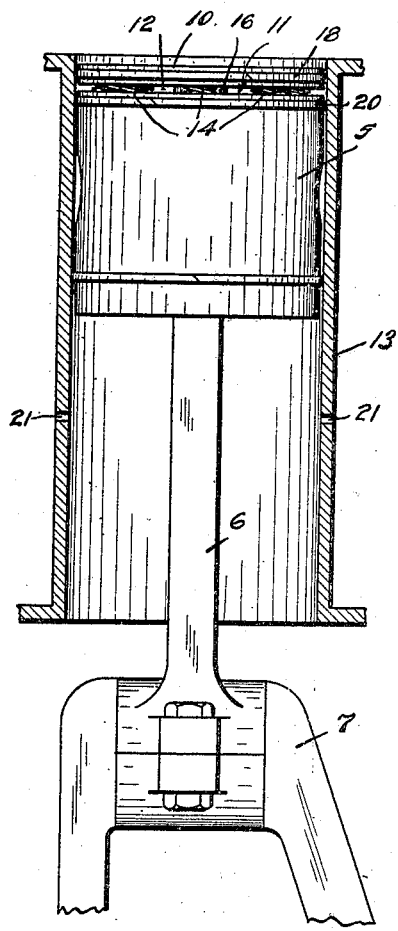
Figure 2:
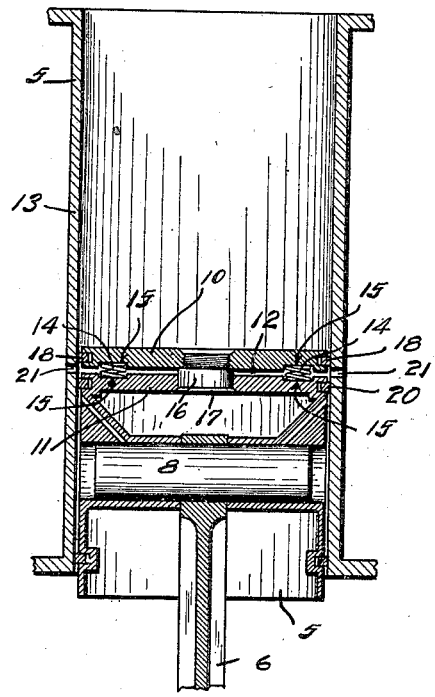
Figure 3:
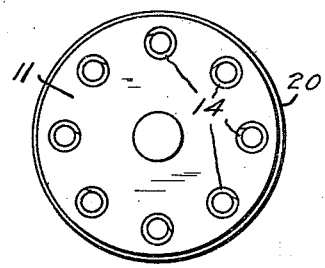

In the accompanying drawings, Figure 1 is a view in elevation of a piston constructed in accordance with this invention, a portion of the cylinder within which the piston is disposed being shown in cross section and the piston being shown at the limit of its upward movement in the cylinder; Fig. 2 is a view in vertical mid section showing the piston at its lowermost position in the cylinder, and Fig. 3 is a plan view showing the top end of the main body of the piston as it might appear with the top plate removed.

Like reference numerals designate like parts throughout the several views.

Referring to the drawings the numeral 5 designates a hollow piston and 6 designates a connecting rod having its lower end pivotally attached to a crank shaft 7 and its upper end pivotally attached to a transverse pin 8 in the piston.

This invention resides in providing upon the upper end of the piston and above the connecting rod pivot pin 8, a separate end section 10 that is normally spaced from the end 11 of the main body of the piston as at 12 and has cushion means interposed in the said space so that when an explosion occurs in the upper end of a cylinder 13 in which the piston is reciprocably disposed the end section 10 will yield slightly relative to the main piston body 5 thereby absorbing the initial shock of the explosion and relieving the connecting rod and crank shaft and the bearings for the same of the strain due to such initial shock.

The cushion between the section 10 and the main body of the piston may be formed by interposing compression springs 14 therebetween and by allowing air to fill the space 12, the greater part of the shock of an explosion being absorbed by the air and the springs offering some resistance to the downward thrust and serving to lift the member 10 after it has been forced downwardly onto the end 11 of the piston by the pressure of an expanding charge.

The ends of the springs 14 are set within shallow recesses 15 in the member 10 and in the end of the piston and the member 10 is secured to the end of the piston by centrally arranged pin 16 that is slidable in the end 11 of the piston and that is screwed securely into the member 10, the pin 16 having a head 17 that limits the movement of the member 10 away from the end 11 of the piston.

The member 10 is provided with a piston ring 18 of the usual form and the main piston body 5 is provided near the upper end with a similar piston ring 20. The piston rings 18 and 20 are located just above and just below the cushion space 12 respectively and serve to prevent the air from being crowded out of the cushion before it has been compressed enough to absorb the initial impact of the explosion.

When the piston is at substantially the lowermost limit of its travel the cushion space 12 will register with perforations 21 that are formed in the walls of the cylinder 13 and if the air has been crowded out of the cushion space 12 such space will again fill with air, the springs 14 serving to lift the member 10 as soon as pressure on such member is relieved by the opening of an exhaust valve.

In the operation of this device when a charge is exploded above the upper piston member 10 the shock or blow of the initial explosion is largely absorbed by the air which forms a cushion within the space 12 and between the piston rings 18 and 20. This greatly lessens the strain on the crank shaft and connecting rod and on the bearings for the same and in this way reduces the wear and danger of breakage of these parts.

The cushioning of the initial shock of the explosion also makes it possible to compress the fuel charge more highly and thus obtain a greater amount of power from each charge than would be possible under a lower compression.

The foregoing description taken in connection with the accompanying drawings clearly discloses the method of construction and principle of operation of this invention, but although I have illustrated and described what I now consider to be a preferred form of construction of the invention it will be understood that the disclosure is merely illustrative and that such changes may be made as are within the spirit and scope of the claims.

What I claim is:

1. A piston composed of separable upper and lower portions that are spaced apart to leave a chamber forming an air cushion therebetween, said air chamber being open around the circumference of the piston.

2. A piston composed of separable upper and lower portions that are spaced apart to leave an air chamber forming a cushion therebetween, said chamber being open around the periphery, and piston rings encircling each portion of said piston and located above and below the open peripheral portion of said air chamber.

3. A piston composed of separable upper and lower end portions having parallel end surfaces that are spaced a slight distance apart to form air cushion chambers that are open at the circumferential portion of said piston, and resilient means between the two portions of said piston for urging the same apart.

4. The combination with an engine cylinder, of a piston reciprocable therein and composed of separable upper and lower portions relatively movable and normally spaced apart to leave a chamber forming an air cushion therebetween, said air chamber being open around the circumference of the piston and air ports in said cylinder arranged to register with said chamber at the lowermost limit of the piston stroke.

5. In an engine a cylinder, a piston disposed therein and composed of separable upper and lower sections that are spaced apart to form an air chamber therebetween, means for limiting the amount of separation of said two sections, means interposed between said two sections for urging the same apart, and air inlet ports in the walls of said cylinder and arranged to register with the air chamber that is formed between said two parts when the piston is at the outermost limit of its stroke.

Signed at Seattle, Washington, this 19th day of March, 1921.

PRESTON H. KUHN.